United States Patent [19]

Adams

[11] Patent Number: 4,625,364
[45] Date of Patent: Dec. 2, 1986

[54] BAIT CUTTING DEVICE

[76] Inventor: Dean J. Adams, 3200 W. Commodore Way, #201, Seattle, Wash. 98199

[21] Appl. No.: 812,939

[22] Filed: Dec. 23, 1985

[51] Int. Cl.$^4$ .............................................. A22C 25/08
[52] U.S. Cl. ........................................ 17/55; 83/466.1; 83/444; 30/304; 17/61
[58] Field of Search ............... 83/466.1, 444; 17/1 R, 17/52, 61; 30/304

[56] References Cited

U.S. PATENT DOCUMENTS

| | | | |
|---|---|---|---|
| 1,185,896 | 6/1916 | Fleming | 83/466.1 X |
| 3,800,649 | 4/1974 | Chinn | 83/466.1 X |
| 4,205,832 | 6/1980 | Kuzio | 17/70 X |

Primary Examiner—Willie G. Abercrombie
Attorney, Agent, or Firm—Cole, George M.

[57] ABSTRACT

An apparatus for cutting frozen fish bait comprising a cutting head having a plurality of spaced-apart cutting blades (50) which are slidably moved between a stack of spacer blocks (26). The blocks include openings (42) to define a tunnel extending from top to bottom of the stack. The blades (50) have a retracted position and an extended position moving across the tunnel. A bottom gate (124) holds its frozen bait in the tunnel until the blades have sliced the bait into pieces. A fluid actuated cylinder (80) and piston 78 are attached to a blade mounting member (60) to provide the cutting power. A cycling valve (94), reversing valve (100) and actuator mechanism (110) provide operator control of the devices contained in housing (12).

14 Claims, 4 Drawing Figures

BAIT CUTTING DEVICE

TECHNICAL FIELD

The invention relates to the field of bait cutting devices and more particularly to an apparatus for cutting frozen herring into a plurality of generally identical bait sized pieces.

BACKGROUND ART

As those skilled in the art are aware, particularly those who fish in cold, sub-polar waters, the existing devices for cutting frozen bait fish such as frozen herring, use different mechanisms for cutting their frozen bait fish. In some instances the bait is cut by hand. However, among the machines used is one with a hydraulic powered shaft with round blades rotating at high speed. The nature of the device makes the cut at ninety degrees to the long dimension of the frozen bait fish body. A primary drawback to the rotating cutting machines is that the herring must be soft in order to be fed into the machine otherwise the herring simply bounces on the cutting edges. Accordingly, since the frozen bait herring is stored on board the boat, the bait must first be thawed in order to be used in such machines. Thawing, however, is a particular problem in cold climates such as Alaska or any other waters in which extreme cold weather may be encountered. Thawing can also be detrimental to bait quality in warm climates where the bait will spoil before it can be used.

As was mentioned some boat crews will still cut their bait by hand. When the number of pieces of bait in a day's time extends into the thousands it will be appreciated that the amount of crew time devoted just to cutting bait is substantial. However, existing machines have not made it possible to cut frozen bait fish.

Among other drawbacks of existing multi-bladed cutting machines, is the fact that none of the known devices can be successfully applied to the task of cutting frozen herring in a speedy and proper manner. Among those drawbacks are long blades which are susceptible to being bent and misshapen by an object as rigid as frozen herring. Additionally, most of the multiple-bladed cutting devices which might be applied to cutting frozen bait use a yoke type holder. This type of blade holder is deficient because it is subject as stated above to being bent and because of the fact that it takes up an undue amount of space or area. Another problem with existing multi-bladed devices is the fact that they have not been designed specifically for a task such as cutting frozen herring. Frozen bait fish such as herring or other substances tend to stick to whatever they are cut against and can be difficult to remove. Another drawback of existing devices is that they have no proven means or procedure for placing the item to be sliced into the device. In just about all cases the bait has to be positioned under the blades and this is a slow, tedious and time-consuming procedure. In the prior art devices having multiple blades for cutting, the blades are attached in a group and obtain their power to cut from a lever attached to a pivot. The pivot method requires an extensive amount of motion and space to operate. For instance, to achieve a cut through a two inch object the end of the lever motion may have to move double or triple the thickness of the object to be cut depending on the resistance encountered. Finally, the pivot method of mounting multiple blades results in a cutting motion that is arcuate and therefore there is a tendency for the hard or frozen object being cut to squirt or to be squeezed away from the pivot.

Among the prior art references of which applicant is aware are the following United States patents, none of which is relevant to the subject matter of the instance invention. The known prior art references are U.S. Pat. Nos. 4,288,921; 843,427; 2,158,667; 717,223; 1,614,282; 2,883,748; 1,078,191; 1,075,439; 1,178,363; 1,183,472; 1,374,278; and 1,582,103. The only one of the identified patents which deals with fish in any way is U.S. Pat. No. 4,288,921 to Rhynes which is a fish scoring device and not a frozen bait cutter.

DISCLOSURE OF INVENTION

The invention comprises a vertical stack of cutting parallel blades separated by plastic spacer blocks and which blades and spacers are disposed at an angle having a high side and a low side. Movement of the blades is linear along the plane of the block faces so that an actuating mechanism such as a cylinder and piston pushes the angled stack of blades forwardly through a vertical tunnel or cavity in which the frozen bait is located. The blades are advanced through the bait and then retracted. A trap door at the bottom of the tunnel is opened to allow the sliced pieces to drop out of the device. Hydraulic fluid or air may be used for the actuator cylinder and piston. The blades and spacers are easily removed for cleaning. The operation of the device includes a hydraulic actuating switch which is activated by movement of the operator's hip or thigh.

Accordingly, it is among the features of the invention to employ a square blade in which the cutting motion is linear by the use of a hydraulic ram or piston and cylinder. The device is simple, inexpensive, reliable, rugged, and easy to use. The device is easy to disassemble and clean and does not present any safety hazzard. The blades of the device are such that they will not bend and no yoke is necessary and consequently the size of the machine is compact. The convenient and easy use of the machine is facilitated by the fact that it includes a cavity or tunnel which is essentially vertical with a trap door or gate at the bottom. In this way it is easy for the operator to drop fish lengthwise into the tunnel, actuate the blades and retract them after which the gate is opened and the parts or slices fall by gravity out of the machine. The design is such that the cut proportions or slices of the frozen bait fish are not jammed between the blades. The belly of the fish and the wider side of the tunnel are disposed towards the blades so the the blades cut toward the narrower or cradle side of the tunnel. The cut is made so that the blades extend through the cutting cavity or tunnel thus cleaning itself. The blades then stop and the motion is reversed with the herring slices between the blades. During the retracting motion the herring is directed towards the wider side of the tunnel where the herring pieces contact the side to be removed from between the blades as the blades retract. The blades stop when they are clear of the tunnel. Accordingly, the time required to cut many thousands of pieces of bait per day is greatly reduced from the known manual or hand operation.

BEST MODE FOR CARRYING OUT THE INVENTION

Figure 3:
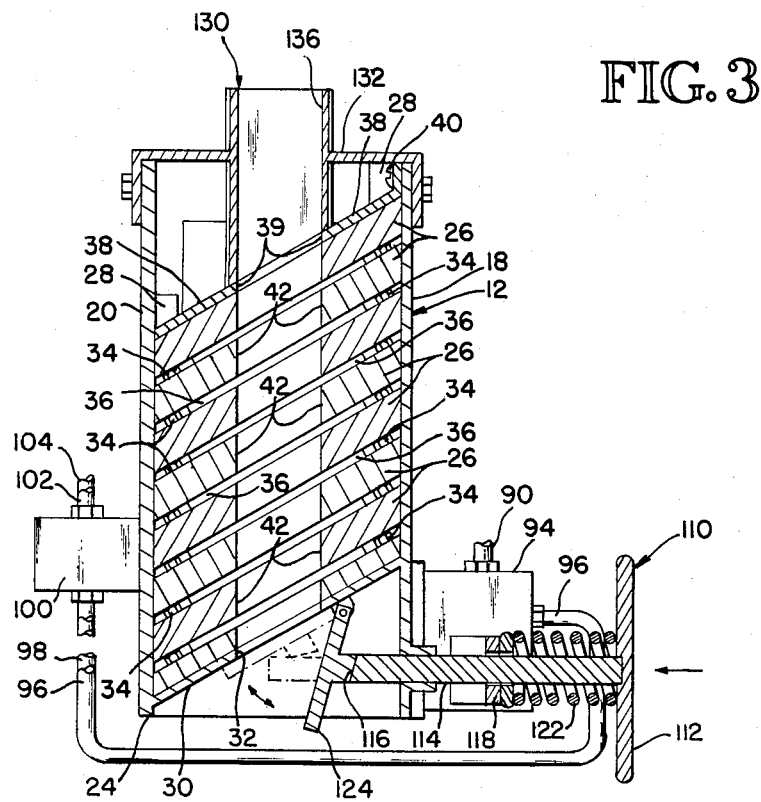
FIG. 3 is a cross-sectional view in elevation taken along the line 3—3 of FIG. 1 showing additional details of construction.

Referring now to the drawings it will be seen that the bait cutting device of this invention, generally designated by the number 10, includes an elongated rectangular housing generally designated by the number 12, having actuator end wall 14, cutting end wall 16, outside wall 18, inside wall 20, upper edge 22 and bottom edge 24. At cutting end 16 on the inside of the housing 12 is received a series or stack of spacer blocks 26 which are dipsosed at an angle and arranged generally vertically as shown. It will be noted between side walls 18 and 20, and end wall 16 that retainer frame members 28 are located so as to firmly hold spacer blocks 26 in position. The housing, reference being had to FIG. 3, shows a bottom support wall 30 extending at the predetermined predesired angle between the side walls and including tunnel opening 32. Above the bottom wall 30 and resting thereon is the bottom-most spacer block 26. Each of the blocks 26 is separated by spacer means 34 which are approximately the thickness of the blades. It will be noted that the spacers 34 are close to the inside surface of the two side walls to define unobstructed blade openings 36. A top hold down plate 38 having opening 39 engages the top-most spacer block 26 and is secured to one side wall by screws or bolts 40 so that the spacer blocks are firmly held in their vertical stack arrangement between the top plate 38 and the bottom wall 30.

Figure 1:
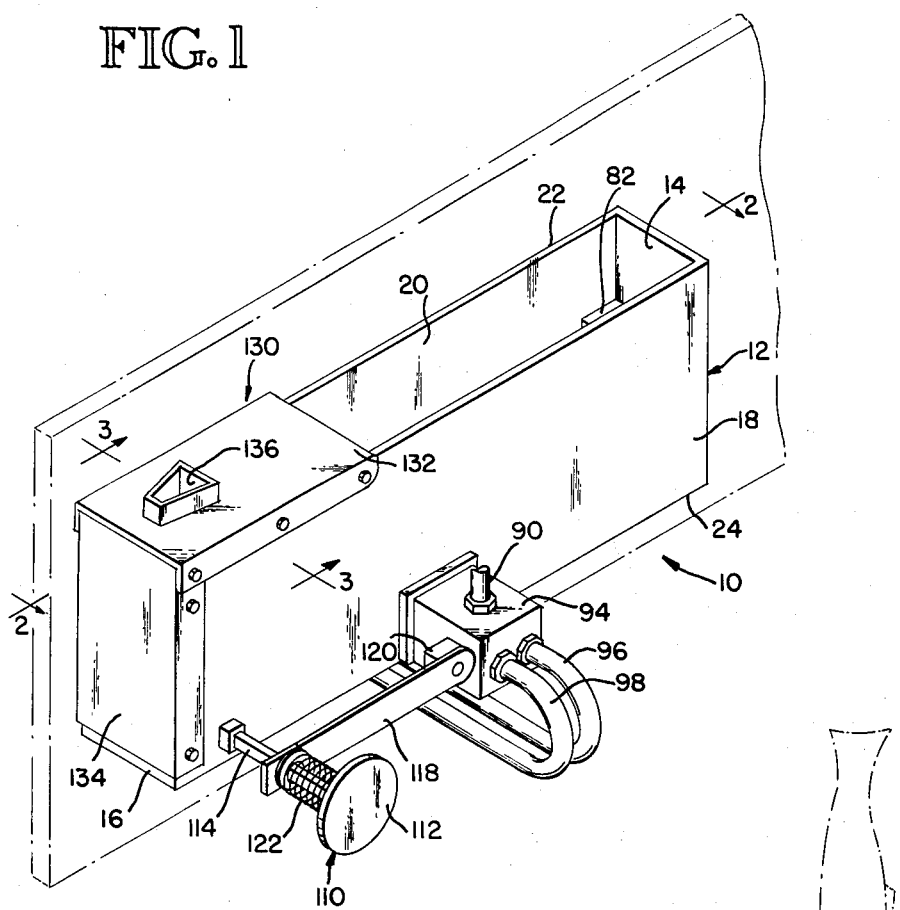
FIG. 1 is a perspective view of the operator's side of the invention showing an elongated, rectangular box containing the parts of the cutter devices.
Figure 2:
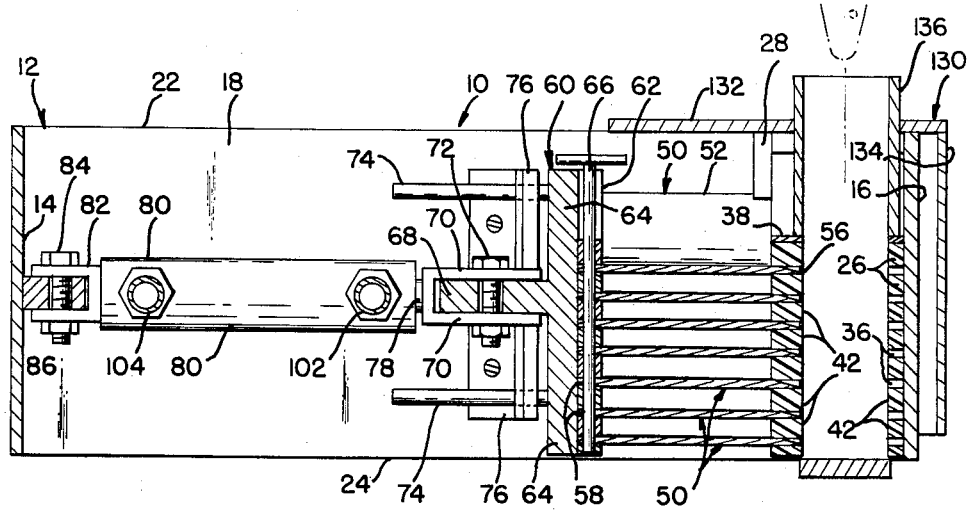
FIG. 2 is an elevational cross-section view along line 2—2 of FIG. 1 showing details of the blades, spacers and actuator parts and other details of construction.
Figure 4:
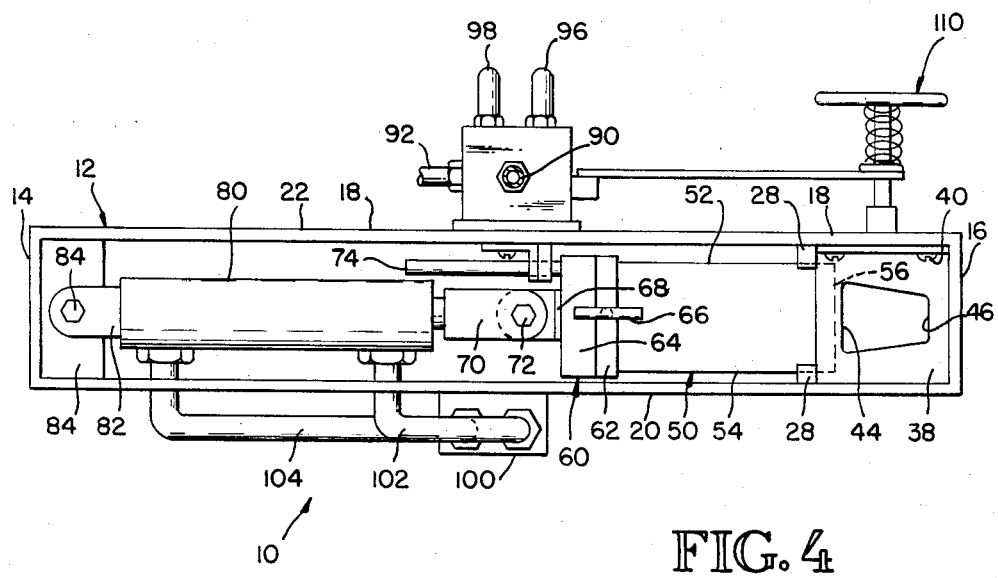
FIG. 4 is a top plan view further illustrating details of construction of the invention.

Blocks 26 have openings 42 which together with the bottom wall 30 and top plate 38 form an unobstructed tunnel or cavity through the entire stack of blocks. The tunnel is essentially trapezoidal in shape with the large end 44 of the trapezoid facing the inside and with the outer smaller edge 46 closest to the end wall. Blades 50, as mentioned above, are generally rectangular, flat or planar metallic members having an upper edge 52 and a lower edge 54 as well as a cutting end and when the blades are retracted the cutting edge 56 is still between blocks 26 but is clear of the tunnel defined by openings 42 in the spacer blocks. At their attachment end 58 the blades 50 are detachably secured to a mounting head 60 having angled bar members 62 which are spaced apart to receive the attachment end of blades 50 between them. Bar members 62 are part of the mounting head 60 which includes base member 64. The attachment ends 58 of the blades 50 extend between bars 62 and butt against base member 64. The blades are held in position by a stack or series of aligned holes extending through the blades and through the bars 62 to receive a removable pin 66. The guide posts 28, best seen in FIGS. 2, 3 and 4, also contain slots in which the edge of the blades 50 are guided.

On the rear of mounting head base member 64 is a connector bracket 68 which connects to piston yoke 70 by bolt 72. It will also be seen that mounting head 60 has guide rods 74 extending rearwardly from one side and which guide rods are slidable received in brackets 76. Yoke 70 is connected to piston 78 which in turn is mounted in hydraulic cylinder or ram 80. The rear end of cylinder 80 has connector yoke 82 which is detachably secured by bolt 84 to frame member 86 on the inside surface of end wall 14.

Hydraulic pressure input and return lines 90 and 92 are connected to actuator valve 94. In turn lines 96 and 98 are connected from the actuator valve 94 to a reversing valve 100 which has lines 102 and 104 connected to cylinder 80.

An operator control mechanism, generally designated by the number 110, includes a disc 112 mounted on slidable rod 114 which extends through side wall 18 and has an inner end 116 which terminates at a predetermined distance inside the surface of side wall 18. An actuator bar 118 extends from rod 114 and is connected to hydraulic switch 120 on valve 94. A compression spring 122 is disposed between disc 112 and bar 118 so that disc 112 is generally biased outwardly along with rod 114. When the disc is engaged by the operator's hip or thigh and shoved inwardly, the actuator valve 94 is cycled so as to move blades 50 into their operative position by sliding across and through the tunnel. The reversing valve 100 reverses the flow of hydraulic fluid or oil and the blades are retracted.

It will be noted that a trap door 124 is mounted at the bottom of the tunnel on the lower support plate 30. When the actuator disc is pushed inwardly to move the blades to their extended position, the trap door is 124 is closed by end 116 of rod 114. As soon as the disc is released it slides outwardly and the trap door or gate is allowed to fall open and the pieces of sliced bait permitted to fall out of the tunnel and housing.

A removable safety cap generally referenced by number 130 is provided with a top cap piece 132 and an end cap piece 134 and also is provided with an aligned cavity 136 corresponding in shape and size to the openings in the spacer blocks. The cavity 136 extends downwardly to approximately top plate 38 at the top of the stack of spacer blocks 26.

I claim:

1. Bait cutting device comprising:
   (a) Housing means,
   (b) a cutting head means within said housing including a series of spaced-apart, generally flat, rectangular and planar blade means having an actuator attachment end and a cutting edge end opposite said attachment end, individual blade means at their cutting edge end being disposed between adjacent spacer blocks, said spacer blocks being arranged in an aligned stack and separated to receive individual blade means therebetween and including openings therein such that a tunnel is defined extending through said stack of spacer blocks, said blade means and said spacer blocks being positioned at a predetermined angle to said tunnel, said blade means including a first retracted piston such that said blades as a unit are withdrawn out of said tunnel and a second operative position whereby out of said tunnel and second operative position whereby said blade means as a unit are moved through and across said tunnel to cut whole bait therein into a plurality of angled slices, and
   (c) Actuator means to which the attachment end of said blades is detachable secured and whereby said plurality of blade means are moved between said first and second positions as a unitary, multi-bladed cutting head.

2. The bait cutting device according to claim 1 and wherein said attachment ends of said series of blades are detachably secured to a mounting head means for quick and convenient removal of said blades.

3. The bait cutting device according to claim 1 and in which retainer means are provided at both ends of said stack of spacer blocks at least on of which said retainer means is removable for quick and convenient removal of said spacer.

4. The bait cutting device according to claim 1 and in which said stack of spacer blocks is arranged so that said tunnel is generally vertically disposed.

5. The bait cutting device according to claim 1 and in which a trap door is pivotally mounted at the bottom of said tunnel to hold bait within said tunnel until said bait has been cut into slices and said blades moved to their retracted position.

6. The bait cutting device according to claim 1 and in which said actuator means includes an actuator mounting base means to which said blades area attached and further including a fluid actuated cylinder and piston for moving said blade means as a unit into their retracted and operative positions.

7. The bait cutting device according to claim 1 and in which said actuator means includes a first fluid actuator valve for initiating movement of said blade means through and to their second operative position and a second fluid reversing valve for retracting said blades to their first retracted position.

8. The bait cutting device according to claim 1 and in which operator control means are connected to said actuator means for selective actuation of said cutting head.

9. The bait cutting device according to claim 2 and in which retainer means are provided at both ends of said stack of spacer blocks at least on of which said retainer means is removable for quick and convenient removal of said spacer blocks.

10. The bait cutting device according to claim 9 and in which said stack of spacer blocks is arranged so that said tunnel is generally vertically disposed.

11. The bait cutting device according to claim 10 and in which a trap door is pivotally mounted at the bottom of said tunnel to hold bait within said tunnel until said bait has been cut into slices and said blades moved to their retracted position.

12. The bait cutting device according to claim 11 and in which said actuator means includes an actuator mounting base means to which said blades are attached and further including a fluid actuated cylinder and piston for moving said blade means as a unit into their retracted and operative positions.

13. The bait cutting device according to claim 12 and in which said actuator means includes a first fluid actuator valve for initiating movement of said blade means through and to their second operative position and a second fluid reversing valve for retracting said blades to their first retracted position.

14. The bait cutting device according to claim 13 and in which operator control means are connected to said actuator means for selective actuation of said cutting head.

* * * * *